Feb. 27, 1940.    D. J. CAMPBELL    2,191,451
MOLDING MACHINE
Filed May 2, 1938    9 Sheets-Sheet 1

INVENTOR
DONALD J. CAMPBELL
BY Liverance & Van Antwerp
ATTORNEYS

Feb. 27, 1940.  D. J. CAMPBELL  2,191,451
MOLDING MACHINE
Filed May 2, 1938  9 Sheets-Sheet 5

Fig_6_

INVENTOR
DONALD J. CAMPBELL
BY
ATTORNEYS.

Feb. 27, 1940.  D. J. CAMPBELL  2,191,451
MOLDING MACHINE
Filed May 2, 1938  9 Sheets-Sheet 6

INVENTOR
DONALD J. CAMPBELL
BY Liverance & Van Antwerp
ATTORNEYS.

Feb. 27, 1940.   D. J. CAMPBELL   2,191,451
MOLDING MACHINE
Filed May 2, 1938   9 Sheets-Sheet 8

INVENTOR
DONALD J. CAMPBELL
BY Liverance & Van Antwerp
ATTORNEY

Feb. 27, 1940. D. J. CAMPBELL 2,191,451
MOLDING MACHINE
Filed May 2, 1938 9 Sheets-Sheet 9

INVENTOR
DONALD J. CAMPBELL
BY
ATTORNEYS.

and against which a sliding shoe 79 bears. A rock shaft 80 passes through the opening 78 and is mounted in bearings in the walls of the air chamber housing 50. An eccentric 81 is provided on the shaft 80 fitting a concaved recess shaped therefor at the underside of the slide block 79. By rocking the shaft 80 the closure valve block 76 may be raised or lowered, permitting escape of air from the air chamber at 82 through the passages 53 when raised, and closing against such escape of air when lowered, as in my previously filed application, Serial No. 755,688, above noted.

Figure 7:
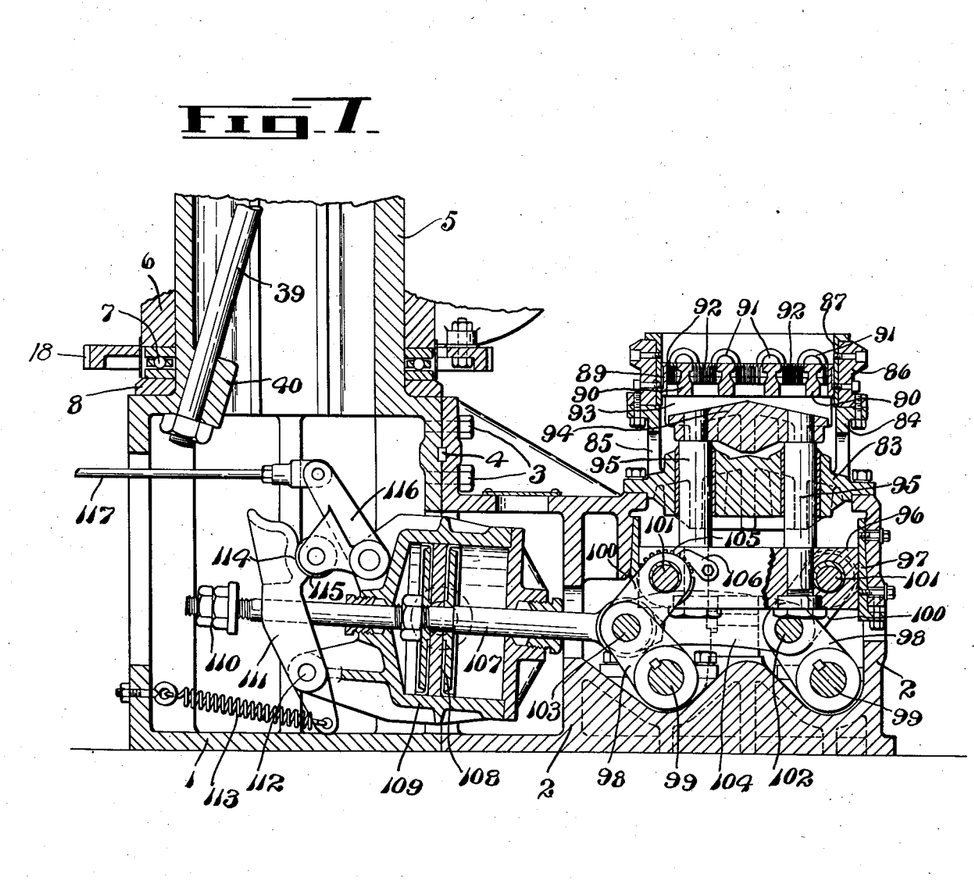
Figure 10:
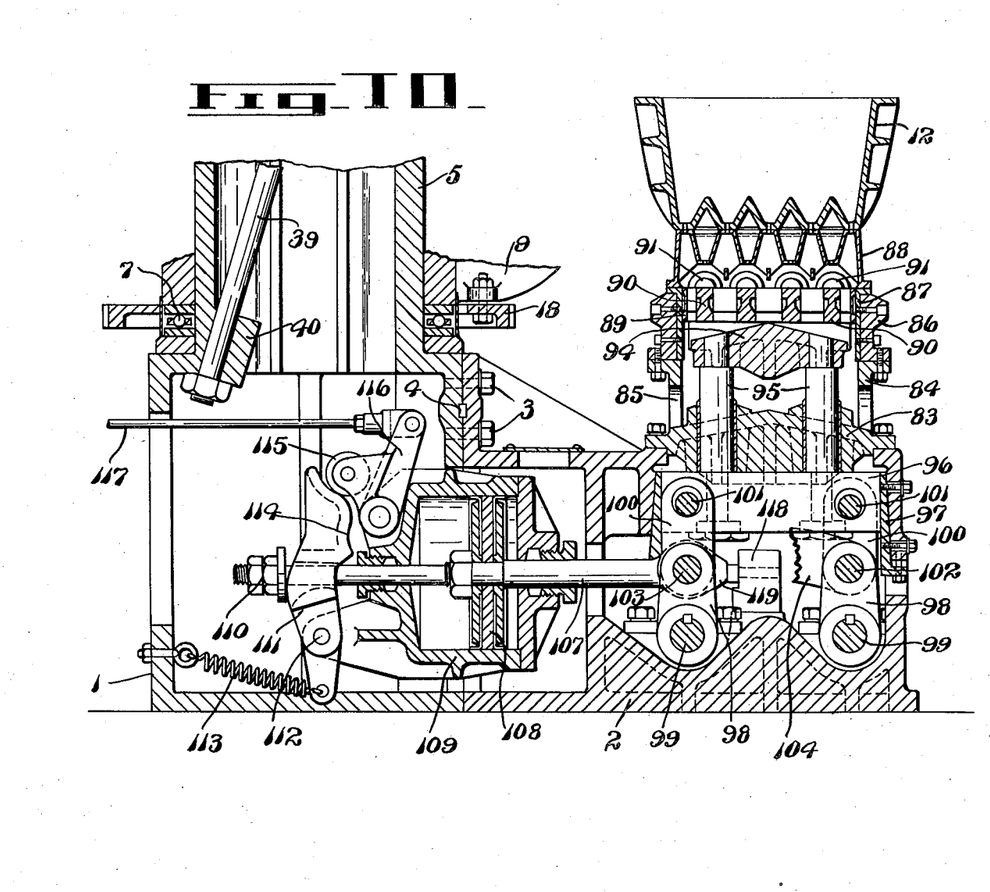

The housing 2 at its upper side has an opening which is closed by a heavy cap 83, integral with and upwardly extending from which is a wall 84 having sand escape openings 85 in its sides. At the upper end of the wall a heavy frame 86 is bolted securely in place. Within the frame 86 a guide sleeve or frame 87 is secured having outwardly extending upper flanges against which the flask 88 which is to contain the mold is positioned after having been turned over or inverted, as shown in Fig. 10. A screen and pattern carrying frame including an outer frame 89 slidable within the sleeve 87, and pattern carrying bars 90 above which the patterns 91 are located (as shown, for cam shafts), and with an air vent screen structure 92 between the bars 90, is connected by depending end pieces 93 with a head 94 secured at the upper ends of vertical rods or posts 95 which are slidable through sleeves positioned vertically in the cap member 83. Such air vent screen and frame structure forms the subject matter of a contemporaneous application filed May 2, 1933 and bearing Serial No. 205,573 and need not be described in detail. The rods or posts 95 at their lower ends are permanently secured to a vertically movable slide block 96 which is positioned within and guided in its vertical movements by a surrounding guide frame 97 disposed within the housing 2, as shown in Figs. 7 and 10.

The block 96 and connected parts is reciprocated through the straightening out or breaking of toggle links connected at one end thereto and at their opposite ends to the bottom of the housing member 2. Links 98 at their lower ends are secured to rock shafts 99 mounted for rocking movement in suitable bearings on the base of said housing 2. Other links 100 are connected to rock shafts 101 mounted for rocking movement on and through the block 96 and having eccentric bearing bushings for adjustment purposes. The links 98 and 100 extend toward each other and at their adjacent ends connect with forward and rear knee or knuckle pivot rods 102 and 103. The rods 102 and 103 are connected by a link 104 which is bowed upward. As shown in Fig. 7, one of the upper shafts 101 (or both of them if desired) carries a ratchet 105 with which a dog 106 mounted on the block 96 is adapted to detachably engage, and thus hold the parts in any upper position to which moved.

A piston rod 107 is connected at one end with the rod or shaft 103. Between its ends it is provided with a piston 108 which is located within a cylinder 109, mounted on trunnions for rocking movement about a horizontal axis, said cylinder being partly within both of the base housings 1 and 2. The piston rod extends through the cylinder and to the rear thereof, at its free end is threaded, and has stop nuts 110 adjustable thereon. The piston rod extension passes through a lever 111 pivotally mounted at 112 near its lower end upon an arm projecting from the cylinder 109. A tension spring 113 acts to turn lever 111 in a clockwise direction. Said lever 111 at its upper front side is formed with a shallow concave recess 114 in which a roller 115, mounted on a lever 116 which in turn is pivotally mounted on the cylinder 109, seats. The upper end of the lever 116 is provided with a horizontally extending operating rod 117. The spring 113 normally holds the lever 111 in the position shown in Fig. 7 with roller 115 seated in recess 114. The rod 117, however, may be moved lengthwise in a forward direction to thus move the lever 116 to the position shown in Fig. 10, whereupon the roller will move upwardly out of the recess 114 and engage against the lever thereabove, as shown in Fig. 10, spring 113 causing the lever to follow the roller. This permits a farther movement forward (or to the right) of piston 108 and piston rod 107 than is permitted when the parts are in the position shown in Fig. 7, as the stop nuts 110 will come against the lever 111 and stop such movement before it reaches the position shown in Fig. 10. A stop block 118 is connected or integral with the bottom of the housing 2 and interposes in the path of a stop projection 119 carried on the rod 103, limiting the movement of the piston and piston rod, and the consequent straightening out of the toggle levers, as shown in Fig. 10.

Figure 8:
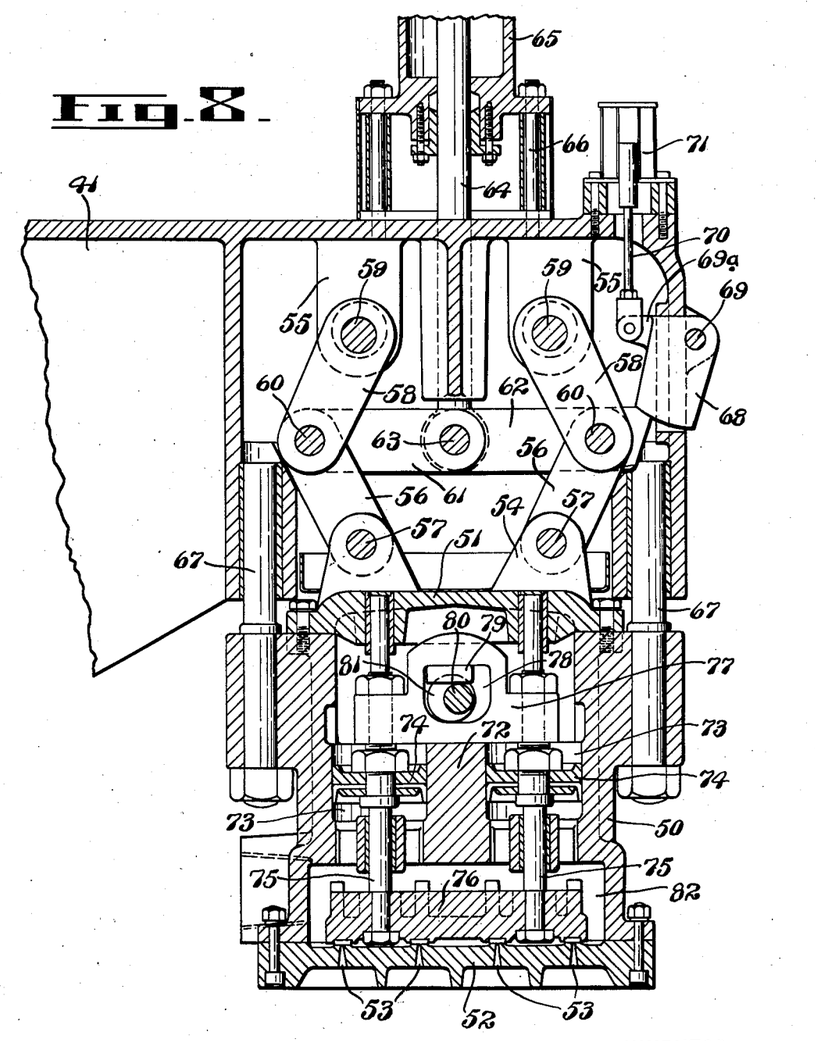

In the operation of the machine, assuming the housing 50 to be in the position shown in Fig. 8, a hopper 12 filled with loose sand may be swung underneath the lower end of said housing 50 and with the lower side of the hopper over an inverted flask 88 placed upon the support therefor below. Spring 15 is designed to hold the hopper with its bottom slightly above the flask 88 and stops 16 and 17 maintain its upper end below the lower closing plate 50 of the air chamber 82. The latch 68 in such case will be in latching position as in Fig. 8.

Figure 1:
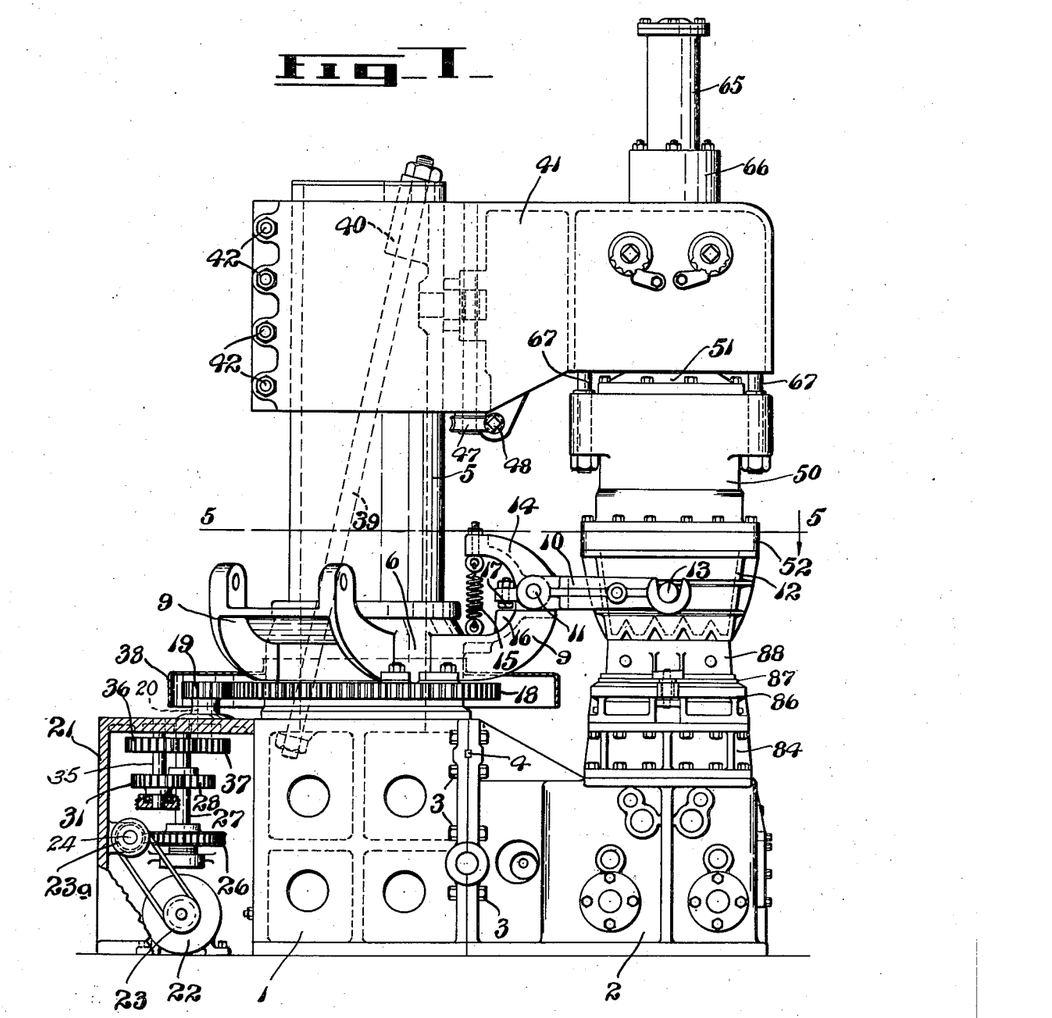
Figure 2:
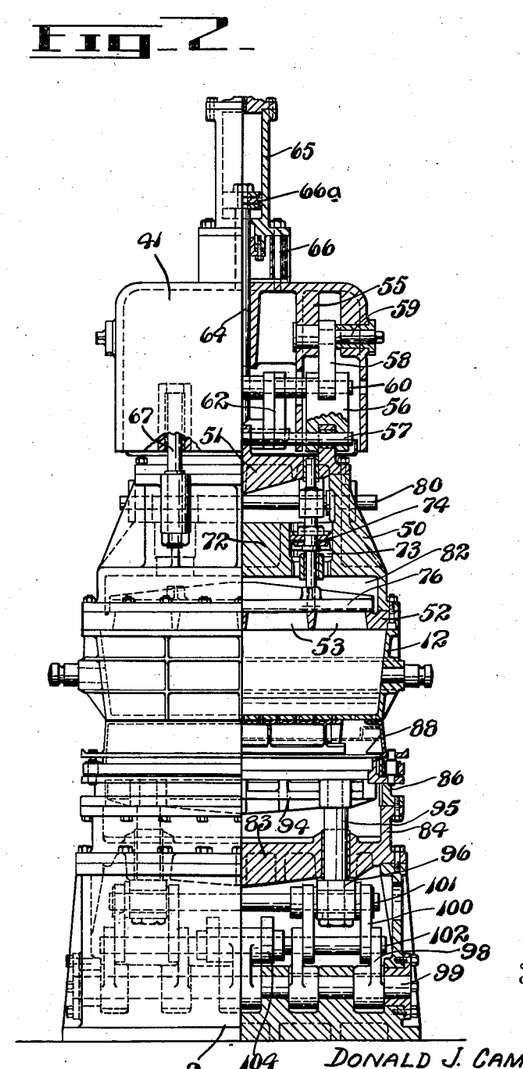
Figure 3:
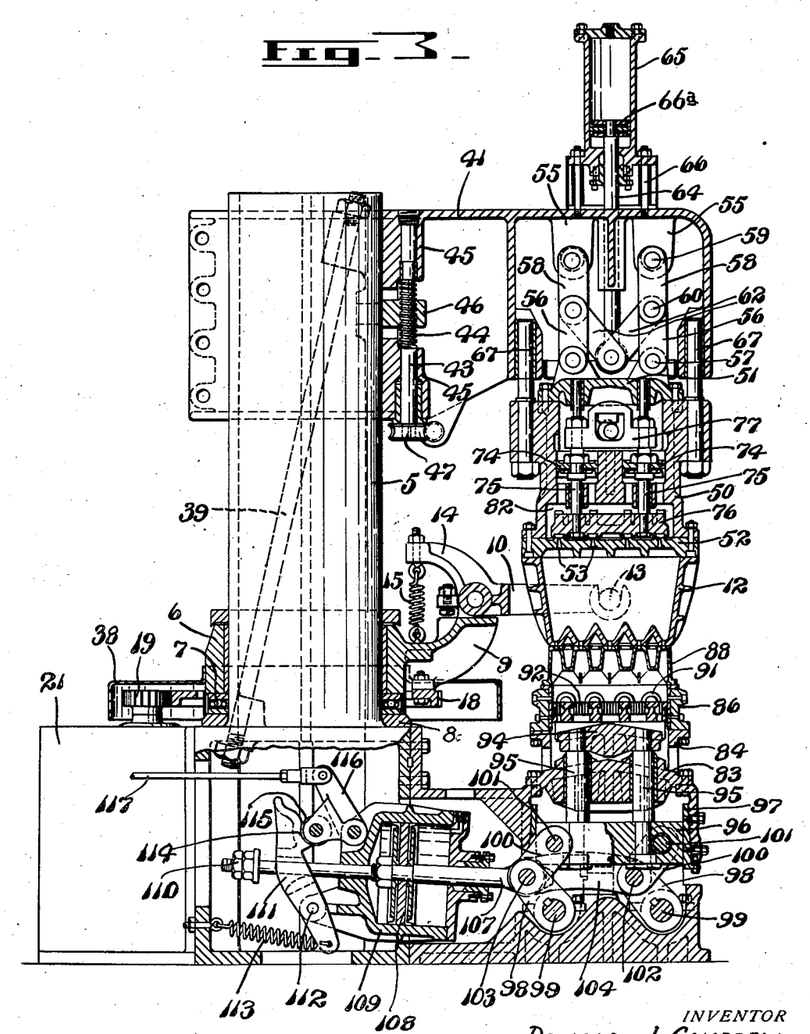
Figures 4, 5:
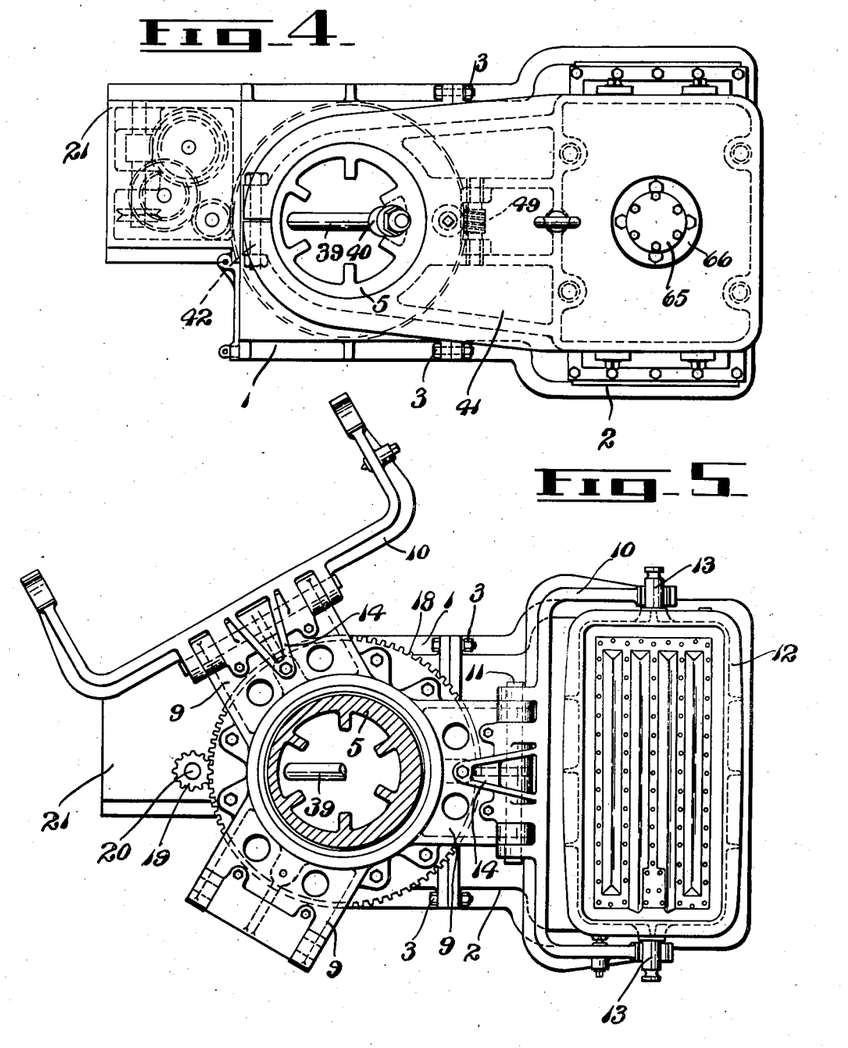
Figure 6:
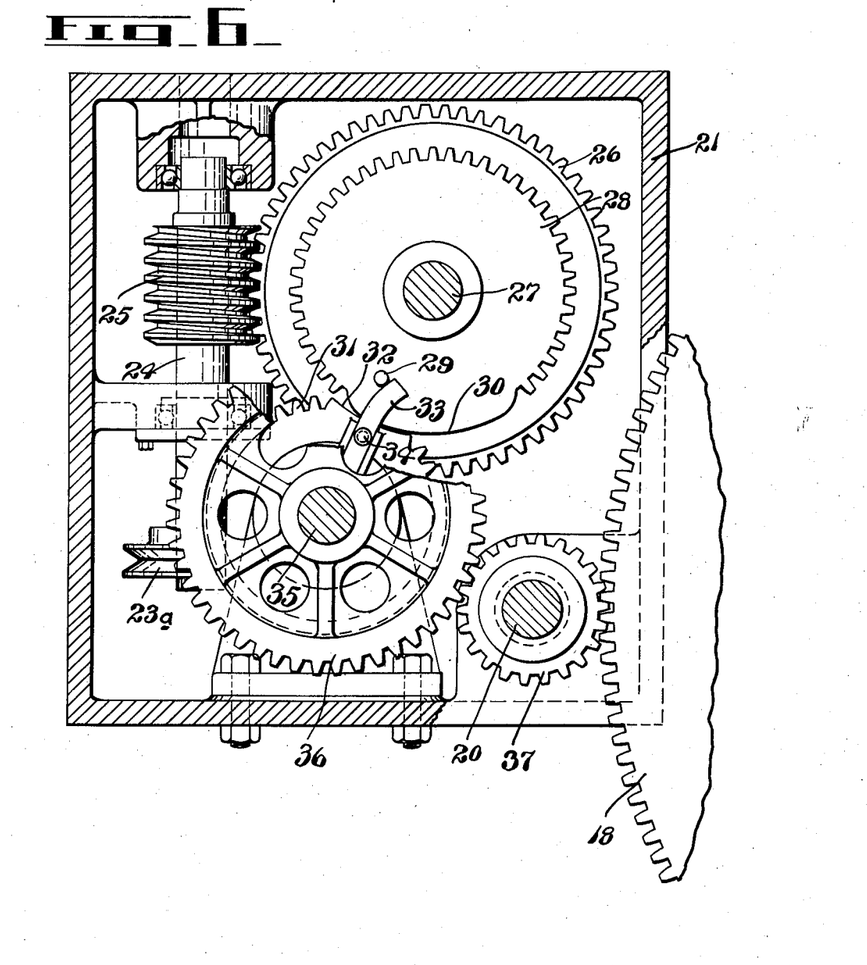

By energizing the solenoid 71 the latch 68 is released and, thereafter, by introducing compressed air above the piston 66a the toggle links 56 and 58 will be straightened, as in Fig. 3, bringing the closure plate 52 against and in closing position above the hopper 12, forcing the hopper downwardly so as to bring its lower side snugly against the upper side of the inverted flask 88. It is to be understood that when this occurs the patterns and the screen frame carrying the same are in the position shown in Fig. 9, that is, with the upper edges of the frame 89 a short distance below the upper edges of the guide frame 87 therefor.

In this position the shaft 80 may be rocked and turned in a clockwise direction to lift the valve block 76 and uncover the air passing openings 53 in the bottom closure plate 52. As fully shown and described in my previous application to which reference has been made, compressed air in the chamber at 82 will have a tendency to hold the block 76 in a lower position. It is partially balanced by an upward pressure against the total area of all of the pistons 74. When the valve block is raised, the compressed air passes through the openings at 53 and forces sand out of the hopper 12 into the flask, filling the same completely and covering the patterns at all parts exposed and coming against the patterns and the air vent screen bars 92, the sand extending within the guide frame 87 a short distance so as to not only fill the flask, but overfill it at its inverted open side.

Figure 9:
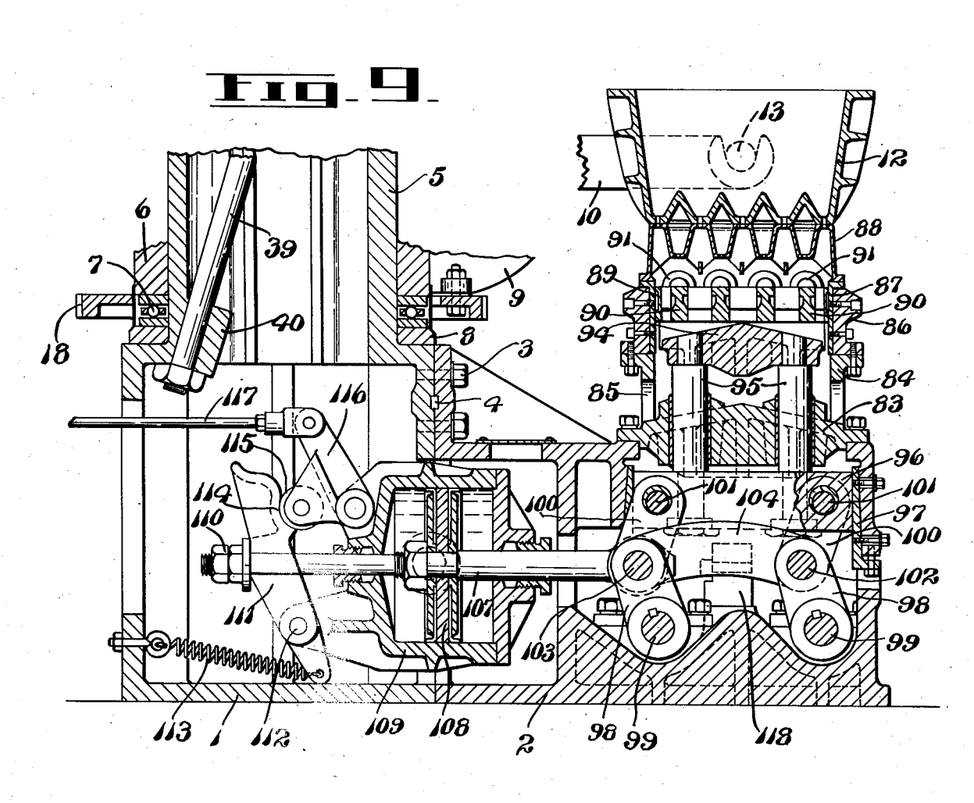

It is to be understood that while this projection of the sand into the flask is taking place the piston 108 will occupy a substantially middle position in the cylinder 109, or as in Fig. 9. Air entered into the cylinder at the rear or left hand side of the piston tends to move the piston forwardly and such movement is permitted until the stop nuts 110 come against the lever 111 which is held latched in the position shown in Fig. 3 by the lever 111 coming against the roller 115, the axis of which is in substantially horizontal alinement with the axis of the pivot of said lever 116.

After the flask has thus been more than filled with sand the next operation is the squeezing operation. Rod 117 is moved longitudinally forward or to the right, thereby releasing the roller 115 from the recess 114, unlatching the lever 111, which is permitted to swing from the position in Fig. 9 to that in Fig. 10, whereupon the piston 108 moves from the position in Fig. 9 to that in Fig. 10, straightening out the toggle links 98 and 97, and moving the patterns and the associated pattern carrying and screen frame upwardly, compressing and squeezing the sand which has previously more than filled the flask into the compass of the flask.

Following the squeezing operation it is then necessary to withdraw the patterns downwardly with a reversal of the movement of the piston 108. Reversal of movement is accomplished by entering the compressed air or other motive fluid to the right hand side of the piston, moving it back to the other end of the cylinder or from the position shown in Fig. 10 to that in Fig. 7. This drops the pattern and the parts which carry it down to the lowest position thereof within the guide frame 87, shown in Fig. 7, completely clearing the mold within the flask of the pattern. The rod 117 is moved longitudinally to the left, again latching the lever 111 in the position shown in Figs. 3 and 7. Of course the rock shaft 80 is rocked in the opposite direction to close off the flow of compressed air into the hopper 12 and after the pattern has been withdrawn, air is directed into the cylinder 65 underneath the piston 66a, lifting the compressed air chamber housing 50, whereupon the hopper is elevated slightly above the flask by spring 15 ready to be swung away from between the flask and the air chamber housing 50. This swing of the flask will follow on the next intermittent rotative movement of the ring 6.

It is to be understoood that with three flasks, and with one of them at the operative position for having sand therein forced into a flask to produce a mold, the flasks at the other positions when stopped, one of them will be at a sand filling station where it is filled with loose sand, and the other at a cleaning station wherein any excess sand left in the hopper after a flask has been filled is removed, and the hopper otherwise cleaned before passing to the sand filling station. Thus, the process is substantially continuous, the stopping of the sand hoppers at the three consecutive stations, one for cleaning the hopper, one for filling it with loose sand, and the third for the forcing of the sand out into a flask to provide a mold, being only for the time which is consumed in these operations, all three with respect to different flasks taking place at the same time. After a hopper has had its sand discharged therefrom into a flask and has been moved away, or immediately after it has been released from the flask by the upward movement of the air chamber housing 50, the flask with the mold therein is removed and an empty inverted flask put in its place.

With the machine as described, a very practical, efficient and easily operated molding machine is produced. All of the operations may be quickly performed. The rotation of the ring 6 which carries all of the sand hoppers may be timed so as to get the greatest quantity production of molds. This molding machine, while similar in many respects to the disclosure of the machine in my prior filed application to which reference has been made, has many marked and valuable improvements which are defined in the appended claims; and the invention is to be considered comprehensive of all forms of structure coming within the scope of such claims.

I claim:

1. In molding apparatus, a flask support adapted to have a succession of inverted flasks carried by said support, a vertical supporting post to one side of the flask support, a ring mounted for rotation around said post, a plurality of brackets projecting laterally from the ring at substantially equally spaced distances from each other, a yoke pivotally mounted on each bracket having spaced apart arms extending substantially horizontally, a sand hopper mounted between the arms of each yoke, means for intermittently driving the ring whereby said sand hoppers are successively brought to and over a flask on said flask support, spring means acting on each of said yokes to normally elevate the hoppers whereby their lower sides are a short distance above their respective flasks when moved thereover, and means to limit the extent of lifting said hoppers.

2. A molding apparatus comprising, a support adapted to have a succession of inverted flasks carried thereby, a vertical post adjacent said support, a plurality of spaced apart sand hoppers around said post and revolubly mounted thereon, driving means for intermittently bringing said sand hoppers over a flask on said support, means to normally elevate the hoppers whereby their lower sides are a short distance above their respective flasks when moved thereover, and means to limit the extent of lifting said hoppers.

3. A molding apparatus comprising, a support adapted to have a succession of inverted flasks carried thereby, a vertical post adjacent said support, a ring mounted for rotation around said post, a plurality of spaced apart sand hoppers mounted on said ring, means for intermittently driving the ring whereby said sand hoppers are successively brought to and over a flask on said support, spring means to normally elevate the hoppers whereby their lower sides are a short distance above their respective flasks when moved thereover, and means to limit the extent of lifting said hoppers.

DONALD J. CAMPBELL.

UNITED STATES PATENT OFFICE

2,191,452
THIAZANE DERIVATIVES

Robert De Wolf Coghill, Hamden, Conn., assignor to Sharp & Dohme, Incorporated, Philadelphia, Pa., a corporation of Maryland No Drawing. Application April 3, 1937,
Serial No. 134,844

11 Claims. (Cl. 260—243)

This invention relates to new organic chemical compounds, and more particularly to new series of compounds based upon and including thiazane 3,5-dicarboxylic acid, which may be graphically represented as follows:

The new compounds included within the invention are compounds based upon the thiazane 3,5-dicarboxylic acid and include acid derivatives of this compound, such as the mono- and di- esters, the mono- and di- acid amides and halides, the nitriles, the nitriloamides, the salts with bases, in which one or both of the carboxylic hydrogens are replaced by metals or nitrogen bases, salts of the esters, etc., with acids (the carboxylic acids do not form crystallizable salts with acids, because of the influence of the carboxyl groups), closely related oxidized derivatives in which the sulfur atom is oxidized to form the corresponding sulfoxides or sulfones or sulfonium salts, and corresponding series of compounds in which the nitrogen-linked hydrogen is replaced by an alkyl, aralkyl, aryl, or other cyclohydrocarbon radical, which may be substituted or unsubstituted. Essentially, all of these new compounds are based upon the thiazane 3,5-dicarboxylic acid; and it will be at once apparent to those skilled in the art that a great number of compounds of the type indicated may be readily produced from this acid or its congeners or homologues, particularly its acyl derivatives, such as the acid chlorides or amides, the production of which may or may not involve the intermediate production of the dicarboxylic acid.

The invention includes not only these new compounds, but also a new process by which the compounds may be produced. Briefly, the process consists in the treatment of an aqueous solution of 3,5-dihydroxythioxane, produced as described in my companion application, Serial No. 134,843, filed April 3, 1937, and which is probably more properly described as a solution containing in equilibrium 3,5-dihydroxythioxane and thiodiacetaldehyde, with ammonium cyanide, or ammonia or its congeners, such as primary amines, including primary alkyl, aralkyl, aryl, or alicyclic amines, and hydrogen cyanide. If ammonium cyanide, or hydrogen cyanide and ammonia be used, a nitriloamide having the probable structural formula:

is produced. Both the nitrile group, and the acid amide group of this compound are carboxylic acid-derived groups, even though the free acid has not been used as an intermediate in its production.

This compound, which is valuable as the starting point for the production of other substituted thiazane derivatives is readily hydrolyzed by concentrated acid to thiazane 3,5-dicarboxylic acid, having the formula:

These two compounds are both valuable as intermediates for the production of various thiazane derivatives, including mono- and di- esters such as may be produced by esterifying one or both of the carboxylic acid groups either with simple alcohols, such as ethanol, propanol, benzyl alcohol, or phenols, such as phenol, cresol, xylenol or other mono- or polyhydric phenol, or amino alcohols, such as dipropylaminoethanol, diethylaminopropanol, diethylaminoethanol, monoethanolamine, etc., to give esters of the types:

and

Such esters may be readily produced from the corresponding acid chlorides and the alcohols or phenols, or from the dicarboxylic acid and the alcohols in the presence of a suitable esterifying agent, such as hydrogen chloride. The esters of the amino alcohols are indicated to have local anaesthetic properties.

If instead of ammonia in the formation of these derivatives primary amines be used, corresponding N-substituted thiazane 3,5-dicarboxylic acids are produced. Among the amines which may be used instead of ammonia, with the production of corresponding N-substituted compounds, are monomethylamine, monoethylamine, monopropylamine, monobutylamine, monoamylamine, and other primary alkyl amines, aniline, the toluidines, the xylidenes, mesidine, benzylamine, cyclohexylamine, cyclopentylamine, etc. The reaction of one of these primary amines and hydrogen cyanide with thiodiacetaldehyde and 3,5-dihydroxythioxane results in the production of the N-substituted nitriloamides, which may be hydrolyzed to the corresponding N-substituted thiazane 3,5-dicarboxylic acids, represented by the structural formula:

in which R may be an alkyl, aryl, aralkyl or other cyclohydrocarbon radical. These N-substituted derivatives may also be used as intermediates for the production of esters, such as the amino alcohol or substituted amino alcohol esters, etc.

It will be noted that the sulfur atom in these compounds has a valence of but 2, so that it may readily be oxidized by suitable agents such as the halogens, nitric acid, potassium permanganate, etc., with the production of the corresponding sulfoxides and sulfones.

The sulfoxide derivatives are obtained when the oxidation is carried out with relatively mild oxidizing agents, such as dilute nitric acid, the sulfur being oxidized to a valence of 4. The sulfoxide of thiazane 3,5-dicarboxylic acid may be represented by the formula:

When more vigorous oxidizing agents, such as concentrated nitric acid, are used, the sulfur is oxidized to a valence of 6, giving the sulfones. The sulfone of thiazane 3,5-dicarboxylic acid may be represented by the formula:

These sulfoxides and sulfones form series of compounds related to those described above, but having the sulfoxide or sulfone structure; rather than the simple thiazane structure.

The sulfoxide and sulfone derivatives may also be prepared by oxidizing the acetalyl sulfide prior to the ring closure, so that the new sulfone or sulfoxide derivatives are produced directly when the ring closure is effected, rather than by the oxidation of the corresponding thiazane derivatives.

The invention will be further illustrated by the following specific description of the production of the amide of 3-nitrilothiazane-5-carboxylic acid and thiazane-3,5-dicarboxylic acid, although it is in no way limited thereto, as it will be immediately apparent to those skilled in the art that these products may be readily converted into a great number of derivatives including derivatives such as esters, amino esters, acyl derivatives, such as the acyl chlorides and amides, salts, phenolic derivatives, sulfones, sulfoxides, etc., by methods well known to chemists.

*Example.*—Acetalyl sulfide is hydrolyzed with dilute hydrochloric acid as described in my companion application Serial No. 134,843, filed April 3, 1937, with the production of an aqueous solution containing thiodiacetaldehyde and 3,5-dihydroxythioxane in equilibrium. Specifically, 53 parts of acetalyl sulfide are hydrolyzed with 300 parts of 0.5% hydrochloric acid by vigorously shaking at about 40 to 50° C. until solution is practically complete. The solution is filtered and concentrated under vacuum at room temperature to about ⅓ the original volume, and to the cooled concentrate are added 11.2 parts of liquid hydrogen cyanide. The mixture is allowed to stand for a few minutes after which an aqueous solution containing 7 parts of ammonia is added slowly with stirring. The resulting solution is placed in an ice-box overnight, after which the reaction product is filtered off and recrystallized from 95% alcohol, in which it is sparingly soluble. A crystalline solid, in the form of yellow needles, melting with decomposition at 192° C. is obtained in good yields. This crystalline material is insoluble in cold water and nearly all common organic solvents except boiling alcohol, but is soluble in concentrated mineral acid. When boiled with concentrated caustic soda it gives off ⅔ of its nitrogen as ammonia. When boiled with 0.05 normal caustic soda, ⅓ of the nitrogen is given off as ammonia in about 20 minutes, the second third of the nitrogen being given off much more slowly, only about ½ of the second third appearing as ammonia in two hours. This crystalline solid is the amide of 3-nitrilothiazane-5-carboxylic acid, having the structural formula:

When this nitriloamide is heated with concentrated mineral acid, it is hydrolyzed to thiazane-3,5-dicarboxylic acid. 10 parts of the nitriloamide obtained as above are refluxed for three hours with concentrated hydrochloric acid, after which the solution is evaporated to dryness on a water bath, dissolved in water and the solution adjusted in pH by the addition of ammonia until it is barely alkaline to Congo red. The thiazane-3,5-dicarboxylic acid crystallizes out in white needles which are recrystallized from water and which contain 1 mol of water of crystallization. The product is obtained in good yields. When heated, the crystals first decrepitate or crackle and then melt with decomposition at 253–254° C. The product has the structural formula:

This dicarboxylic acid, as well as the corresponding N-alkyl, N-aralkyl, N-aryl and N-alicylic acids, may be produced in stereoisomeric forms, that described above apparently being the cis- or meso- form. By using somewhat higher temperatures in the production of the intermediate nitriloamide, the trans-form of the acids may be produced as mixtures of the dextro- and laevo- acids, which may be resolved into their constituents. These isomeric forms may be used in the same manner as the meso- form, for the production of corresponding derivatives, which in general show the usual relationship of stereoisomeric compounds. For example, if, during the treatment of the thiodiacetaldehyde and 3,5-dihydroxythioxane with ammonia and hydrogen cyanide the temperature be permitted to rise, a nitriloamide, isomeric to that described above, but melting at 210° C. (uncor.) is obtained. This, when hydrolyzed with mineral acid, yields a thiazane-3,5-dicarboxylic acid melting at 270° C. (uncor.). I believe that these products are optical isomers of the products previously described, and apparently are composed of racemic mixtures of the trans-compounds. The reactions involved in the formation of the dicarboxylic acid of the